(12) United States Patent
Thomas et al.

(10) Patent No.: US 8,219,244 B2
(45) Date of Patent: Jul. 10, 2012

(54) SURROGATE-BASED CONTROL SYSTEM

(75) Inventors: Robert J. Thomas, Brier, WA (US);
Mark A. Behar, Woodinville, WA (US);
Stuart G. Donaldson, Bothell, MN (US)

(73) Assignee: Honeywell International Inc.,
Morristown, NJ (US)

( * ) Notice: Subject to any disclaimer, the term of this patent is extended or adjusted under 35 U.S.C. 154(b) by 1121 days.

(21) Appl. No.: 12/103,474

(22) Filed: Apr. 15, 2008

(65) Prior Publication Data

US 2009/0259342 A1    Oct. 15, 2009

(51) Int. Cl.
*G01M 1/38* (2006.01)
(52) U.S. Cl. ........................................................ 700/227
(58) Field of Classification Search ................ 700/19, 700/276, 277, 278, 299, 300
See application file for complete search history.

(56) References Cited

U.S. PATENT DOCUMENTS

| | | | | |
|---|---|---|---|---|
| 4,947,928 A * | 8/1990 | Parker et al. | ................. | 165/208 |
| 5,390,206 A | 2/1995 | Rein et al. | | |
| 5,944,098 A * | 8/1999 | Jackson | ....................... | 165/217 |
| 7,034,660 B2 | 4/2006 | Watters et al. | | |
| 7,448,435 B2 * | 11/2008 | Garozzo | ...................... | 165/11.1 |
| 7,567,844 B2 * | 7/2009 | Thomas et al. | ................. | 700/19 |

* cited by examiner

*Primary Examiner* — Albert Decady
*Assistant Examiner* — Chad Rapp
(74) *Attorney, Agent, or Firm* — Seager Tufte Wickhem LLC

(57) ABSTRACT

A system for surrogate control of a space that incurs an ineffective sensor connection with its controller for running environmental conditioning equipment to maintain the space at one or more certain environmental parameters such as temperature. A selection of a surrogate space from which the surrogate control is obtained, may be made by correlation of data over time and specifications of other spaces in a building complex. The surrogate control may be from the controller of the space selected for control of the space having the ineffective sensor connection. The surrogate space may be a construct of one or more spaces. It may be based on a virtual space that combines behaviors of other spaces for a good match. Diagnostics may be effected from information about spaces in the system.

22 Claims, 5 Drawing Sheets

SURROGATE-BASED CONTROL SYSTEM

BACKGROUND

The invention pertains to environmental controls of occupant spaces, and particularly to controls of spaces that fail. More particularly, the invention pertains to remedying failed environmental controls of spaces.

SUMMARY

The invention is a system that uses a surrogate approach for providing control of an occupant space that loses a benefit of its environmental conditioning equipment due to a loss of connectivity of its sensor or sensors with the controller of the equipment.

DESCRIPTION

Figure 1:
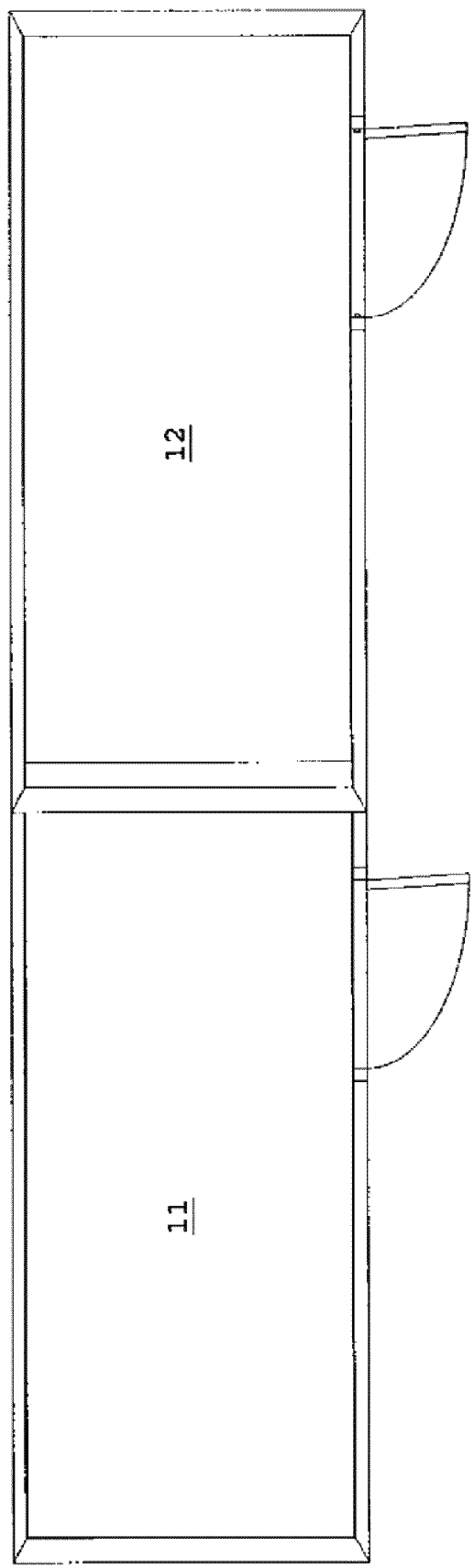
FIG. 1 is a diagram of a space and a candidate surrogate space for environmental control.

The invention is a system that uses a surrogate approach for providing control of an occupant space that loses a benefit of its environmental conditioning equipment due to a loss of connectivity of its sensor or sensors with the controller of the equipment. The loss of connectivity may be due to the sensors being wireless or wired sensors that have failed. The system may select a surrogate space from a number of spaces in the same complex which have similar environmental control parameters as the occupant space having the sensors that lost connectivity with their controller. The selection of a surrogate space may take into consideration various parameters of numerous spaces over time and be a result of analyses of them. The best surrogate space for a space which may incur sensor connectivity failure or discrepancy may change from time to time due to changing parameters and their historical aspects. The controller of the surrogate space may exchange information with the environmental conditioning equipment of the occupant space in order to maintain adequate control. Once the sensors of the occupant space regain connectivity, control of its environmental equipment may return to the controller for the occupant space. This would imply that wireless or wired sensors ensure comfort of an occupant's office in an as a reliable fashion as if the sensors were instead still available to the controller. The system for providing surrogate control may have application to other kinds of environmental conditioner failures or discrepancies of an occupant space.

Rules may be established for what the controller should do if it no longer has changing updates for the sensors in a space. The rules may include a global or building controller keeping a table of alternate behaviors based on sensor(s) in other spaces. If one VAV (variable air volume box), as an illustrative example, loses communication to the sensor, then it may take on a mimic behavior with the VAV controller in the next room. This mimic behavior may be initiated anywhere within the control architecture. When properly implemented, the loss of a sensor node should not result in dramatic changes in the environmental controls.

In constructing wireless based controls solutions, or wired systems with poor availability, a sensing element may be non-responsive for unpredictable periods of time. The customer may need the ability to maintain control of the environment in an acceptable fashion even under such circumstances. One may define several terms. A "controlled space" may be an area or zone that is controlled based on a pairing of a controller and at least one sensor. A "non-responsive controlled space" may be a space that has lost the benefit of its sensors, wireless or wired. A "surrogate space" may be a controlled space that has been identified as behaving under a particular set of circumstances in a very similar way to the controlled space that has lost wireless or wired communication between the sensor and its controller.

A surrogate-based controls approach may be implemented using a methodology to establish a "surrogate space" that behaves similarly to the space being controlled. For instance, when more warm air is added to the "surrogate space", then the controlled space may also add warm air.

In FIG. 1, when a controller for office 11 detects that it is not receiving periodic updates for its controlled space sensors, it may initiate a control sequence. Office 11 may be then considered as a non-responsive controlled space. The control sequence may be constructed to match the control operations in the "surrogate space". The "surrogate space" may be office 12. When office 12 opens an actuator, it may communicate that condition to the controller for office 11. Office 11's controller may then command the actuator in the space of office 11 to open the same amount as that of the actuator for office 12. This may continue until the non-responsive sensor in office 11 begins communicating again. Sensors of concern may include a temperature sensor, humidity sensor, $CO_2$ sensor, CO sensor, occupancy sensor, and/or other sensors as desired. Additionally or alternatively, there may be other kinds of sensors in the spaces which benefit from the present system.

The present system may provide an approach to establish surrogates for building control. In using wireless or wired temperature sensors, it frequently happens that a sensor is unavailable for a certain period of time. If that time is substantial, then the office or space will start to divert from the ideal controls approach. The system may establish other spaces which can be used as "surrogate spaces" in controlling that space. This alternate control approach may keep the comfort of a space under control. The present system may identify spaces that correlate well to the space where communications have been lost. After a period of time, or where there is a change in temperature in the room that is still in communication, environmental control of the room may start to automatically follow the other room relative to the control.

The present system may correlate a series of measured variables for virtually all of the controlled spaces in a building. The first of these may involve integrating the total airflow and energy that goes into a particular space. For example, the temperature of the air, the flow rate, and the actuator status may yield a total energy profile. Also included in an equation may be over-ride requests by the occupants and/or other over-ride factors. If a space or room is requesting cooler conditions in a similar pattern to that of conditions in another room, that may create a correlation. The present system may recognize that the surrogates can vary from one another due to different seasons, thermal loading, outside temperature, and so forth. Factors used in establishing surrogates for the present system may include cooling demand versus time, outside air temperature versus solar loading, heating demand versus time, the size of ductwork, and the control devices in a space. The size of a VAV box, as an example, may override requests for more cooling or heat if today is similar to yesterday. Then the same controlled space yesterday may be a surrogate for the non-responding controlled space today.

Trend logs may be used to record the environmental conditions of different spaces in a building. Records may be made of the room temperature, the airflow rate, the actuator opening, outside air temperature, time of day, temperature in the air duct, and so on. A correlation may include the total BTU going into a space or out of it. The space or room pair with the highest correlation may establish a surrogate pair. Virtually all of the spaces of a building may be correlated to other spaces. The best correlations for each space or room may be put on a list. The list may form the basis of the surrogates used for the alternate control approach. The list may continuously be updated and changes may be checked to assure that the best surrogate available is captured every day.

Collected information, surrogate correlation numbers, and so on, may be used in predicting service needs in the building. The system may involve building control software, wireless sensors, unitary controllers, building level controllers, among other things.

Surrogate control metrics may be used for predictive maintenance. As buildings get older, it is important to identify failing subsystems before they impact the control of and the occupant's comfort in the building. Where one has established a surrogate control approach, the data from continuously updating surrogate metrics may be used to predict maintenance needs in the controlled spaces. The present system does not necessarily use idealized system performance numbers but instead uses values derived from comparing each controller and controlled space to virtually every other controller and space in the building.

Surrogate metrics may be continuously updated to ensure that the best surrogate for control purposes is used when necessary. The present system may take data from the ongoing evaluation of metrics for the surrogate and apply them to the problem of preventative maintenance. When a group of spaces, which have a high correlation in view of surrogate metrics, has one space that starts to deviate from the correlation, it is indicative of a service need in the diverging space. If several spaces are diverging from a correlation, then a service opportunity exists in the air handler, boiler, or chiller that is handling the group of diverging spaces. The present system may include continuous review and analysis of data of the surrogate metrics in order to detect an unexpected divergence type of certain performance and then notify the appropriate operator/service company.

Often an approach may appear to focus on a change of behavior in a single controlled space rather than a correlation to the other spaces through the surrogate metrics. The present system may perform the latter approach by comparing a space that is changing relative to the other spaces. This approach enables the system to pinpoint and isolate problems to specific spaces, air handlers, duct work, and so forth. There may be an approach for establishing similar environmental control behaviors. The approach may include correlating performance of a first space and a second space. The correlating may involve one or more factors. These factors could include energy demand, thermal performance, solar loaded spaces, source of heating, source of cooling, outside air, time of day, date, occupancy pattern, override temperature requests, humidity, and so on. The correlating may lead to a figure of merit for establishing a best fit primary surrogate. The correlating may identify secondary surrogates in the event the primary surrogate is in a failure mode making sensor data unavailable.

An approach for watching surrogates may include continually monitoring a table of one or more surrogates to identify potential service issues, comparing surrogate behavior figures of merit for differing times of the year and solar loading characteristics for determining whether surrogate equipment for providing environmental control or conditioning, such as heating, cooling, outside air, and so forth, are behaving in line with their historic behavior.

Temperature control may involve a controlled space for the present illustration. So one's office may be a controlled space in that it has for instance one temperature sensor and one VAV controller to modulate the airflow into the space. There may be some selection criteria or metrics for the optimum surrogate, but for definition purposes, one might select a neighboring office as the best surrogate space. The office may have the same size, the same window placement, and/or other similar attributes. Each office may have a laptop computer but no refrigerator in the space. It may be noted that the respective occupants like cool offices. Both spaces may feed off the same air handler and rely on the same size ductwork and VAV box. The controlled space may have more than one surrogate space pairing if reasonable performance similarities exist. Their use may be prioritized based on the best surrogate space that is currently in wireless contact with its sensors. Metrics or criteria may include space temperature, airflow rate, actuator openings, outside air temperature, date and time of day, solar loading, heating/cooling demand, BTU in/out, temperature in air ducts, VAV size, area and volume of the space, and/or one or more like metrics or criteria.

The surrogate control approach may prevent the generation of a trouble ticket by the system for some predefined period of time. These kinds of availability gaps may be tracked to monitor the success of the surrogate control approach and any lingering problem with sensor availability in wireless or wired systems. One will not necessarily generate a problem ticket that needs a service technician until an availability problem has gone on for a considerable amount of time or the customer has noted a failure to control the environment adequately. Application of the surrogate control approach may mask the customer/occupant from noticing such problem for substantial periods of time. The problem could last for days undetected by the customer with a proper surrogate control approach. During this period, remote diagnostics may be applied to see if any other controller can receive messages from the sensor. Perhaps other non-noticeable ways to reestablish communication between the sensor and controller of the controlled space may be applied. In general, the approach of the present system may effectively meet the customer's critical need of not noticing differences between the environmental conditions when sensors are available or not.

An approach to establish the surrogate spaces may derive from time controls for a given building where installed. For example, a program was started and has been running in the background to compare how different spaces of the building behave. Spaces were identified in the simplest form that have similar cooling or heating needs on days with a given outside temperature. The program may find and quantify different spaces which behave similarly to build a table of surrogate or proxy spaces. So, if a sensor is no longer available in one space, then action in response may be taken based on the surrogate spaces.

An illustrative example would be in Phoenix during August; for instance, the change in cooling demand for space occupied by a customer over the course of a day may be huge. If a controlled space goes non-responsive and it is allowed to just act as if the temperature sensor was still available, then the customer may become very uncomfortable and have many complaints. On the other hand, if the surrogate controls approach is exercised, then the space will begin to cool down and the customer may stay comfortable no matter how hot it gets outside.

Figure 2:
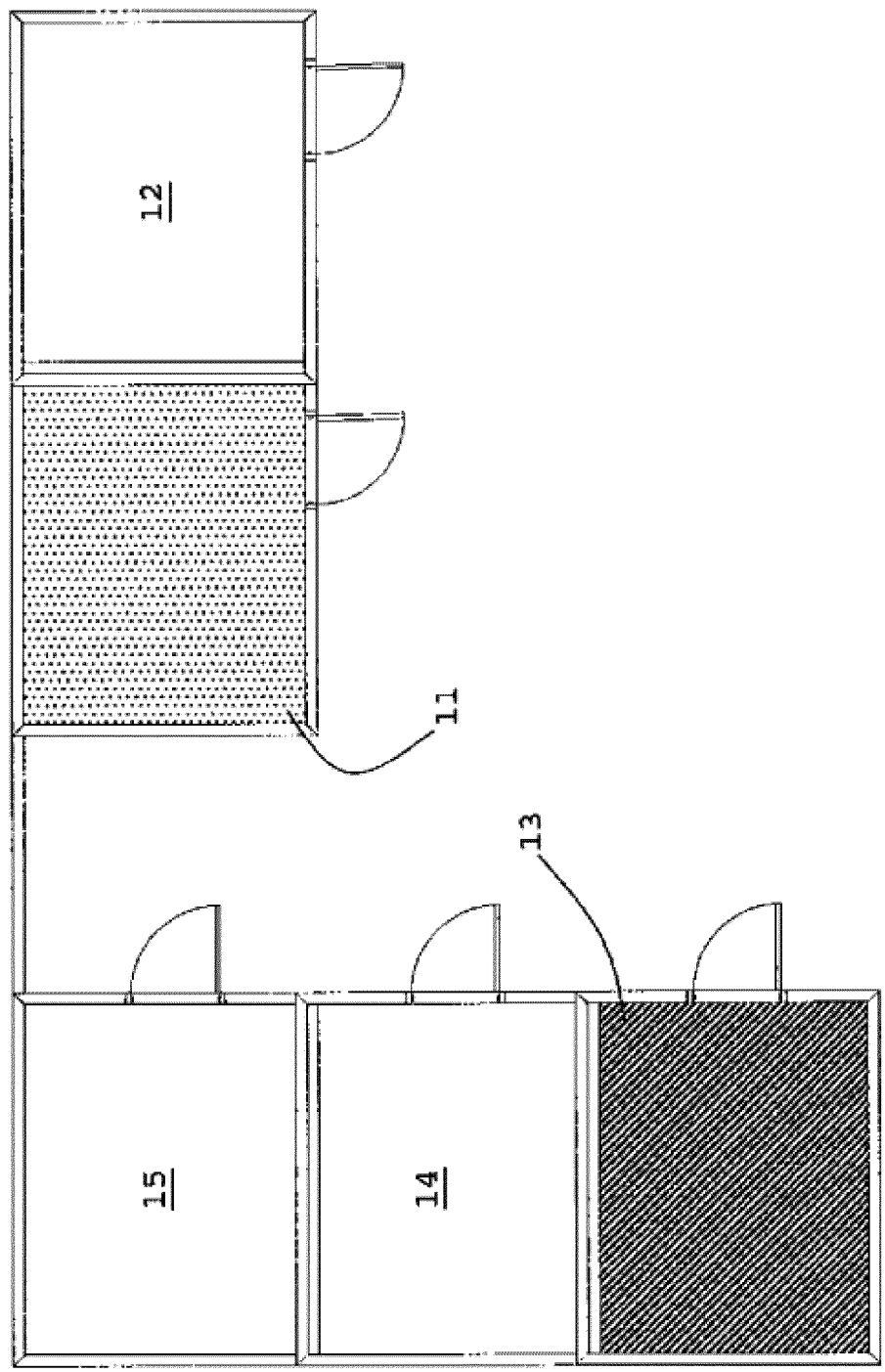
FIG. 2 is a diagram of a group of offices for surrogate illustration.

FIG. 2 shows a five office layout for illustrative purposes. Office 11 is shown with shading to be cold. Office 12 is shown to be under normal environmental control. As noted herein, office 12 may be the surrogate office for office 11. However, the approach of the present system is to prevent office 11 from becoming cold in the first place. Another space, office 13, may show a lack of environmental control because of one or more sensors having failed to communicate relative to its respective controller. Office 13 is shown in FIG. 2 as being hot and thus needing some cooling control, as indicated by a diagonal line pattern. The present system with the surrogate control approach should have prevented office 13 from being hot to begin with. A surrogate office may be selected for environmental control of office 13. Examples of surrogate offices in FIG. 2 may be offices 12, 14 and 15.

Correlation of data, mentioned herein, may indicate a best choice of which office to select as a surrogate. Although office 14 is adjacent to office 13, it may not be the best one to be selected as a surrogate for reasons as indicated by correlated data of the offices. Several factors that may result in poor data correlation between the offices may include office 13 having more windows than office 14 because of its being a corner office, and the occupant of office 14 preferring warmer conditions than the occupant of office 13. There may be additional factors of differentiation. In a large multi-story office building complex, a selection of a surrogate for an office may be chosen from among more offices than those shown in FIG. 2, as this Figure is an illustrative example. The surrogate choice could include the same controlled space but on a previous day. For instance, if yesterday's outside environmental conditions are very similar to today then yesterday's behavior of the controlled space may be a good surrogate for today.

A surrogate may be a construct of multiple spaces rather than just one space. It may be based on a virtual space that combines behaviors of other spaces to achieve a good match. A good match may a correlation of data and/or environmental information with that of one or more other spaces. This type of surrogate may be applicable to or a substitute for the other surrogates mentioned herein.

Figure 3:
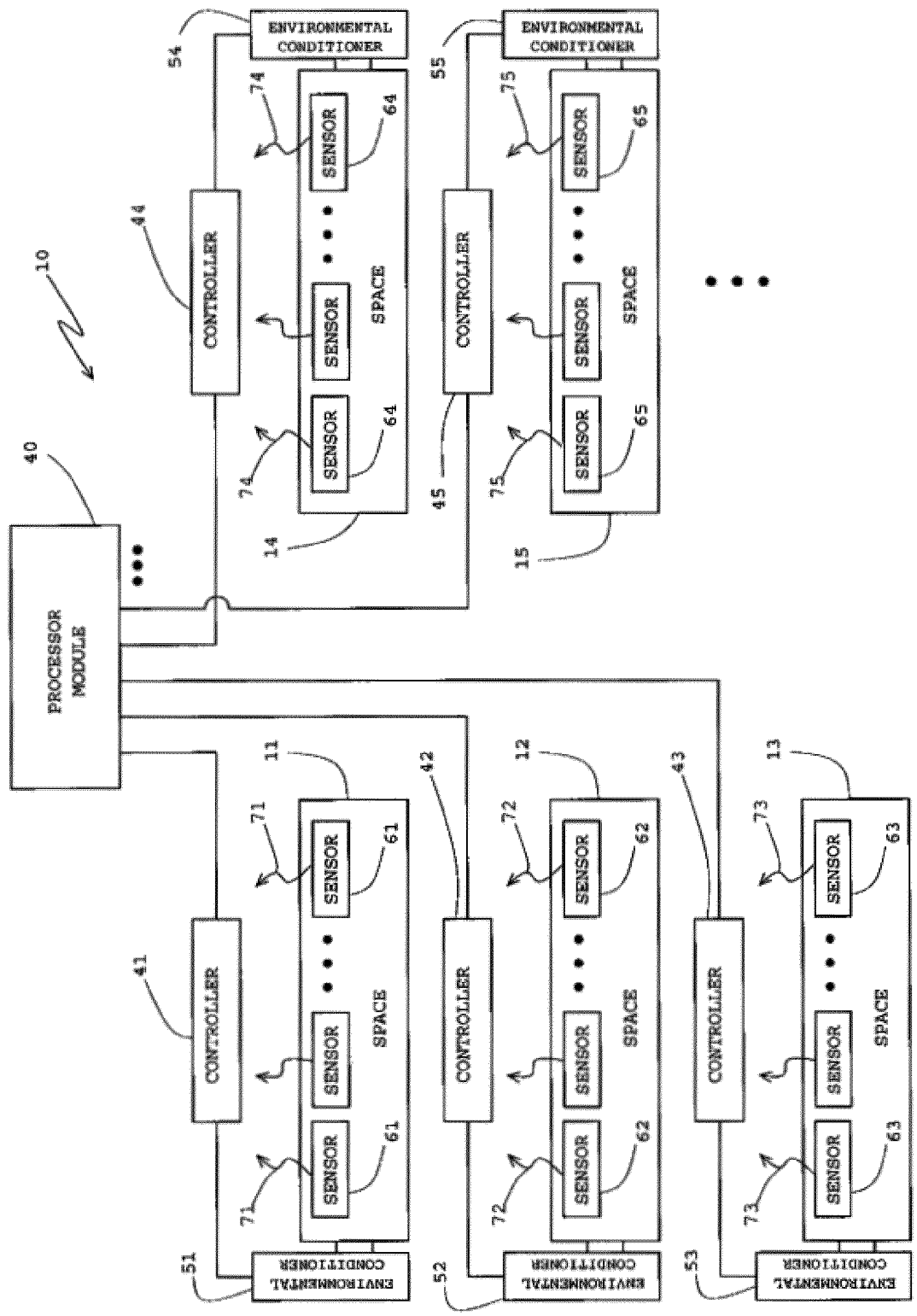
FIG. 3 is a diagram of an overall surrogate panel controls system.

FIG. 3 is a diagram of the surrogate-based control system 10 for a building complex of spaces and/or offices. System 10 may have a processor module 40 which may be a BACtalk control module (BAC) or a like kind of module. Module 40 may have inputs and outputs connected to controllers 41, 42, 43, 44, 45 and other controllers as may be present in the building. The several lines and bidirectional connections from module to each controller may be shown as one line for illustrative clarity. Other connections may be shown in the same manner. Controllers 41, 42, 43, 44 and 45 may be connected to environmental conditioners 51, 52, 53, 54 and 55, respectively, of spaces 11, 12, 13, 14 and 15. The other controllers in the building connected to module 40 may be connected to their respective environmental conditioners of other spaces although not specifically shown in FIG. 3. Spaces 11, 12, 13, 14 and 15 may each have one or more sensors 61, 62, 63, 64 and 65, respectively. The other spaces in the building may also have such sensors. The sensors may be wireless, as indicated by signals 71, 72, 73, 74 and 75 between sensors 61-65 and controllers 41-45, respectively. However, wired sensors may also be used with the present system 10.

Figure 4:
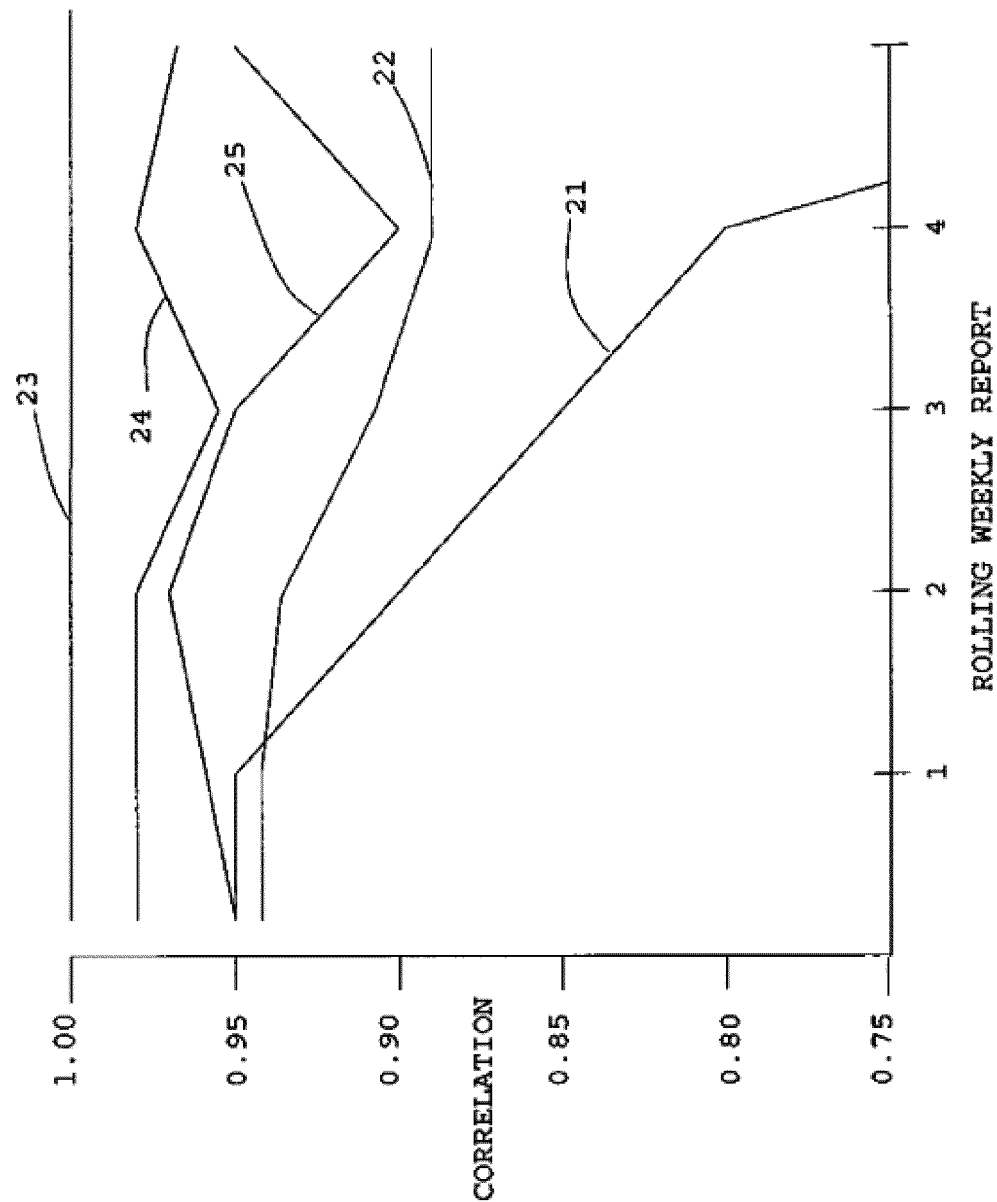
FIG. 4 is a graph of correlation of environmental parameters among the offices shown in FIGS. 2 and 3.

One or more of the sensors in the space may be temperature sensors and/or other kinds of sensors. The environmental conditioners may be or include VAVs, roof top units, heat pumps, fan coil controllers, chillers, loop heating or some other kind of HVAC related equipment. One might note that the sensor or sensors 63 of office 13 may lose connectivity with controller 43. The module 40 may notice conditions such as temperature to deteriorate or deviate from expected conditions in office 13. That may be when the module 40 goes to its running list of surrogates for the various spaces in the building. How the list may be developed and maintained is described herein. Module 40 may indicate that the best surrogate for office 13 is a space or office 14. Thus, environmental conditioner 54 control signals from controller 44 of space 14 may be selected and directed by module 40 to and through, or around, controller 43 to environmental equipment 53 for environmental control or conditioning of office 13. The surrogate control may continue until connectivity of the sensor or sensors 63 is reestablished with controller 43. The selection of the surrogate space is shown in the description of FIG. 4 and in its application in FIG. 5. The present surrogate-based control system 10 may apply to other kinds of scenarios besides environmental control of spaces.

The graph of FIG. 4 reflects surrogate-based system plots of correlation. The system may keep rolling averages of metrics. It may compare all spaces, such as offices, and look for a divergence. If one space diverges, then that may be a signal to notify an operator of a service need for that space (e.g., VAV box). If multiple spaces diverge, then that may be a signal to notify an operator of a service need (e.g., chiller/boiler) for several spaces.

The graph of FIG. 4 has plots 21, 22, 23, 24 and 25 indicating correlations of various offices 11, 12, 14 and 15, respectively, relative to office 13 of FIG. 2. They are of data noted herein for use in developing a correlation. These correlations may be plotted over a period of about five weeks. This graph may be a rolling weekly report showing data up to more or less five weeks old. As data become older than five weeks, the correlation results for those data may fall off the graph but can be stored in a memory. Data may be collected and correlations may be plotted for a period of years besides weeks to reveal items like seasonal and long term effects such as, for instance, those due to aging.

Plot 23 is a correlation of data of office 13 relative to itself which should be a one. Plot 24 shows a correlation of office 14 data relative to office 13 data. Plots 22 and 25 are correlations of office 12 and 15 data relative to office 13 data, respectively. Plot 21 is a correlation of office 11 data relative to office 13 data. Plot 21 shows a situation that may be deteriorating in office 11 which appears to be a cause for concern and investigation. Office 14 appears to have the highest level of correlation (i.e., plot 24) according to other plots of correlation in the graph of FIG. 4. Thus, office 14 may be considered as the best candidate to be the surrogate office for office 13. As time moves on, the highest level of correlation may change from plot 24 to another plot and thereby result in a different office as a surrogate for office 13.

Figure 5:
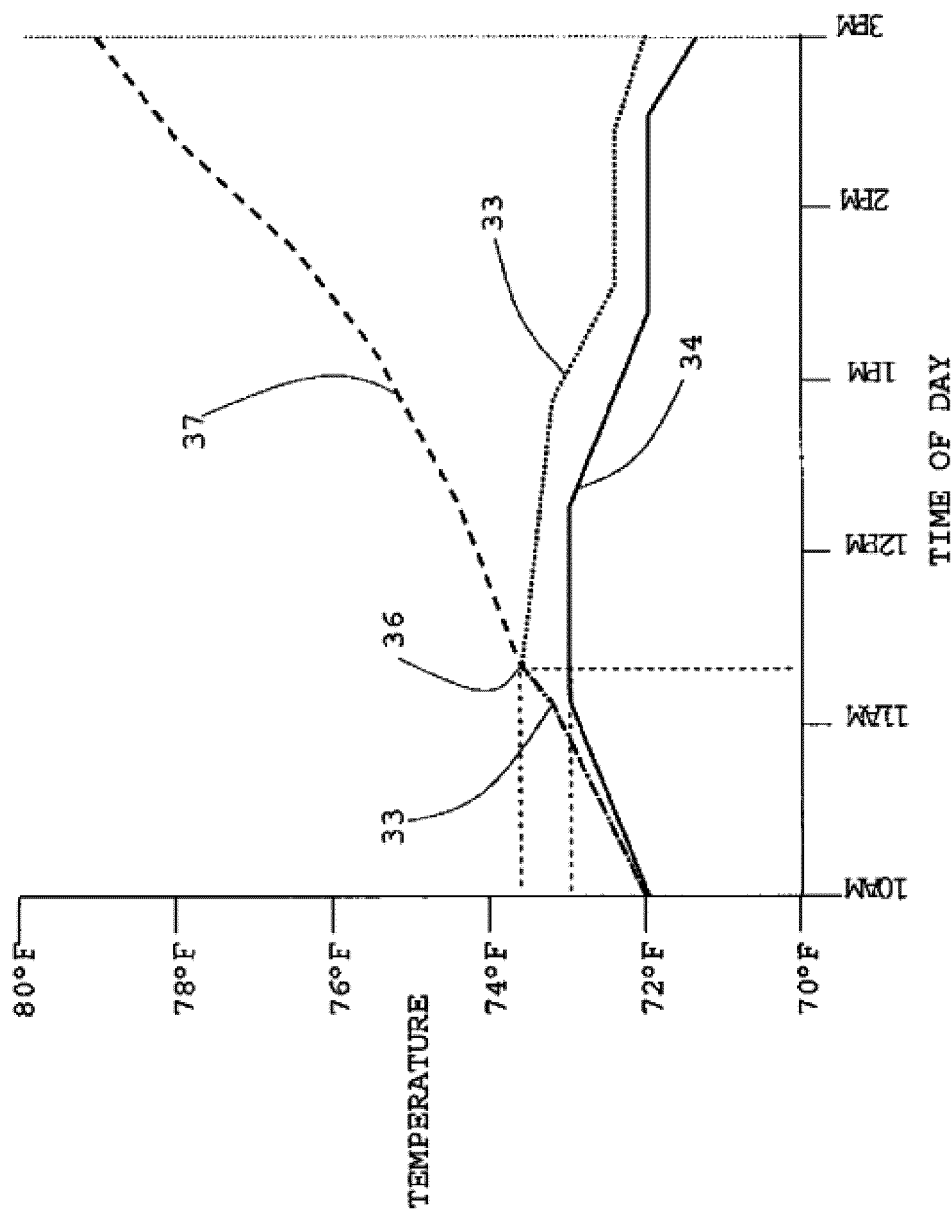
FIG. 5 is a graph showing an office having its temperature control being taken over by the control of a surrogate space.

FIG. 5 is a graph which reveals an operation of surrogate control in a case of a wireless sensor disconnection with its controller. For instance, one may note that office 13 of FIG. 2 is beginning to get hot due to a wireless control failure such as a loss of connectivity of a wireless sensor, i.e., a temperature sensor. That means a surrogate office should be selected. The graph of FIG. 4 would indicate office 14 to be selected as a surrogate for office 13 in view of the correlation plot 24 versus the other correlation plots.

The temperature versus time of the day in office 13 is shown by a curve 33. The temperature in surrogate office 14 versus time of the day is shown by a curve 34. It may be noted that at 10 AM the offices 13 and 14 are at 72 degrees F. according to curves 33 and 34, respectively. Shortly after 10 AM, the temperature curves 33 and 34 begin to part from each other revealing a difference in temperatures which appears to be over one-half degree F. at about 11:20 AM, as shown at point 36. At this point of temperature difference, surrogate control may start. Control of the VAV box or other environmental conditioner for office 13 may be taken over by the controller for the VAV box or other conditioner for office 14. As may be seen in the graph, a differential of approximately one-half degree F remains between the temperature of offices 13 and 14 according to curves 33 and 34, respectively, through about the end of the office day, which is shown to be through 3 PM. If the sensor or sensors 63 of office 13 reconnect with controller 43, then the surrogate control may stop. One indication of surrogate control, besides a lack of sensor signals at the office 13 controller, may be the temperature curve 33 beginning to track closer to curve 34. However, the difference between curves 33 and 34 may instead be from a fraction of a degree to several degrees F.

However, if surrogate control does not kick in at point 36, the temperature of office 13 may increase significantly, especially on a hot day, as indicated by a curve 37, and result in a noticeably uncomfortable occupant. An opposite temperature trend may occur on a rather cold day without surrogate control.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for establishing surrogate control, comprising:
   discovering a lack of connectivity by one or more sensors of a first room with a controller for environmental conditioning equipment for the first room; and
   selecting a second room to be a surrogate room for the first room;
   wherein a controller of the second room is connected to the environmental conditioning equipment or controller for the first room;
   wherein the selecting a second room includes selecting the second room from a group of rooms according to one or more criteria comprising room temperature, airflow, actuator openings, outside air temperature, date and time of day, solar loading, heating/cooling demand, BTU in/out, temperature in air ducts, VAV size, air duct capacity, and/or area and volume of the room.

2. The method of claim 1, wherein the one or more criteria comprise a trend log of behavior of an environment of a room.

3. The method of claim 1, further comprising correlating one or more criteria of potential second rooms of a group of rooms, with one or more criteria of the first room, for the selecting of the second room to be the surrogate room for the first room.

4. The method of claim 1, further comprising selecting the second room from a group of rooms, according to temperature variation analyses of the rooms.

5. The method of claim 1, further comprising analyzing temperature differentials between the second room selected as a surrogate room and the first room, before and/or after connectivity of sensors of the first room is reestablished, for future selecting a second room to be a surrogate room for the first room.

6. The method of claim 1, wherein a temperature of the first room is to be kept within several degrees F of a temperature of the surrogate room.

7. A method for diagnostics comprising:
   providing a space having sensors connected to a controller for environmental conditioning equipment having one or more criteria;
   providing other spaces having sensors connected to a controller for environmental conditioning equipment;
   comparing one or more criteria of the space with one or more criteria of the other spaces; and
   noting divergences among one or more criteria of the spaces; and
   wherein:
   a divergence of the one or more criteria of one space from the one or more criteria of other spaces is indicative that the one space may have a problem or service need; and
   a divergence of the one or more criteria of two or more spaces from the one or more criteria of the other spaces is indicative that the two or more spaces have a common problem or service need.

8. The method of claim 7, wherein the one or more criteria comprise space temperature, airflow, actuator openings, outside air temperature, date and time of day, solar loading, heating/cooling demand, BTU in/out, temperature in air ducts, VAV size, air duct capacity, area and volume of the space, and/or one or more other criteria.

9. A surrogate-based controls system comprising:
   a building comprising two or more rooms; and
   wherein:
   a first room of the two or more rooms is associated with at least one other room of the one or more rooms, which is selected as a surrogate for the first room; and
   a controller of the surrogate is available for connection to an environmental conditioning equipment or controller of the first room, in case of a connectivity discrepancy of one or more sensors with the controller for the first room.

10. The system of claim 9, wherein the surrogate is selected on a basis of a comparing a history of environmental metrics with a history of environmental metrics of the first room.

11. The system of claim 10, wherein the history of environmental metrics comprises that of room temperature, air flow, actuator openings, outside air temperature, solar loading, air duct temperature, date and time of day, cooling/heating demand, BTU going into a room, BTU leaving a room, air duct capacity, VAV size, area and volume of a room, and/or other items.

12. The system of claim 10, further comprising:
   a processing module connected to a controller of each of at least two of the two or more rooms; and
   wherein the processor module is for comparing the history of environmental metrics of the first room with histories of environmental metrics of the other of the two or more rooms to determine a room of the other two or more rooms which is most similar or nearly most similar to the first room and thus to be designated as the surrogate for the first room.

13. The system of claim 9, wherein each of at least two of the two or more rooms has at least another room of the two or more rooms to be designated as a surrogate for the respective room.

14. The system of claim 10, wherein:
a comparing of histories of environmental metrics of the rooms for designating a room as a surrogate for another room is generally continuous; and
a room designated as a surrogate for another room is configured to be capable of changing from time to time as the history of environmental metrics changes for each of at least two the two or more rooms.

15. A room environmental control system comprising:
two or more rooms; and
a processor module; and
wherein:
each of at least two of the two or more rooms comprises:
one or more environmental sensors;
an environmental conditioner; and
a controller connected to the one or more environmental sensors, the environmental conditioner, and the processor module;
the processor module is for detecting when a controller receives inadequate or no signals from its respective one or more environmental sensors, recording data from the one or more environmental sensors, correlating the data and/or environmental information from the one or more environmental sensors of each room, and selecting a surrogate room based on the correlated data and/or environmental information for a certain room having a controller receiving inadequate or no signals from its respective one or more environmental sensors.

16. The system of claim 15, wherein the processor module is for connecting the controller of the surrogate room to the environmental conditioner or controller of the certain room.

17. The system of claim 16, wherein the controller of the surrogate room is for providing environmental control of the certain room according to an environmental setting or settings of the controller for the surrogate room via the environmental conditioner or controller of the certain room.

18. The system of claim 16, wherein the data and/or environmental information comprises room temperature, airflow, actuator openings, outside air temperature, date and time of day, solar loading, heating/cooling demand, BTU in/out, temperature of air ducts, VAV size, air duct capacity, area and volume of the room, and/or one or more other data and/or information.

19. The system of claim 16, wherein the processor module is for correlating data and/or environmental information about each of at least two rooms of the two or more rooms as a rolling historical report over a selected period of time from past to present.

20. The system of claim 16, wherein:
the surrogate room is constructed from multiple rooms; and/or
the surrogate room is a virtual room which combines certain behaviors of other rooms to achieve a correlation of data and/or environmental information with that of one or more other rooms.

21. The system of claim 16, wherein:
the processor module is for continually monitoring one or more surrogates to identify potential service issues; and/or
the processor module is for comparing surrogate behavior figures of merit for differing times of the year and solar loading characteristics for determining whether surrogate equipment for providing environmental control or conditioning are behaving in line with their historic behavior.

22. A method for establishing similar environmental control behaviors, comprising:
correlating performance of a first room and a second room; and
wherein:
the correlating involves one or more factors;
the factors comprise energy demand, thermal performance, solar loaded rooms, source of heating, source of cooling, outside air, time of day, date, occupancy pattern, override temperature requests, humidity;
the correlating leads to a figure of merit for establishing a best fit primary surrogate; and
the correlating identifies at least one secondary surrogate in the event that the primary surrogate is in a failure mode making sensor data unavailable.

* * * * *